United States Patent
Yang et al.

(10) Patent No.: US 9,614,263 B2
(45) Date of Patent: Apr. 4, 2017

(54) THERMAL MANAGEMENT SYSTEMS FOR ENERGY STORAGE CELLS HAVING HIGH CHARGE/DISCHARGE CURRENTS AND METHODS OF MAKING AND USING THEREOF

(71) Applicant: IntraMicron, Inc., Auburn, AL (US)

(72) Inventors: Hongyun Yang, Auburn, AL (US); Bruce J. Tatarchuk, Auburn, AL (US); Troy J. Barron, Auburn, AL (US); Paul S. Dimick, Auburn, AL (US)

(73) Assignee: IntraMicron, Inc., Auburn, AL (US)

( * ) Notice: Subject to any disclaimer, the term of this patent is extended or adjusted under 35 U.S.C. 154(b) by 0 days.

(21) Appl. No.: 14/624,349

(22) Filed: Feb. 17, 2015

(65) Prior Publication Data

US 2015/0236386 A1    Aug. 20, 2015

Related U.S. Application Data

(60) Provisional application No. 61/940,105, filed on Feb. 14, 2014, provisional application No. 61/947,695, (Continued)

(51) Int. Cl.
*H01M 10/625* (2014.01)
*H01M 10/613* (2014.01)
(Continued)

(52) U.S. Cl.
CPC ....... *H01M 10/625* (2015.04); *H01M 10/613* (2015.04); *H01M 10/653* (2015.04);
(Continued)

(58) Field of Classification Search
None
See application file for complete search history.

(56) References Cited

U.S. PATENT DOCUMENTS

| 3,384,154 A | 5/1968 | Milton |
| 3,396,782 A | 8/1968 | Emery |

(Continued)

FOREIGN PATENT DOCUMENTS

| CN | 2005344968 | 12/2005 |
| CN | 102664292 | 9/2012 |

(Continued)

OTHER PUBLICATIONS

Machine translation of Chinese Patent Publication 103178314 published Jun. 2013.*

(Continued)

*Primary Examiner* — Patrick Ryan
*Assistant Examiner* — Wyatt McConnell
(74) *Attorney, Agent, or Firm* — Pabst Patent Group LLP

(57) ABSTRACT

Thermal management systems for high energy density batteries, particularly arrays of such batteries, and methods of making and using thereof are described herein. The system includes one or more thermal conductive microfibrous media with one or more phase change materials dispersed within the microfibrous media and one or more active cooling structures. Energy storage packs or arrays which contain a plurality of energy storage cells and the thermal management system are also described. Further described are thermal or infrared shielding blankets or barriers comprising one or more thermal conductive microfibrous media comprising one or more phase change materials dispersed within the microfibrous media.

28 Claims, 7 Drawing Sheets

Related U.S. Application Data filed on Mar. 4, 2014, provisional application No. 61/969,401, filed on Mar. 24, 2014, provisional application No. 61/979,293, filed on Apr. 14, 2014.

(51) Int. Cl.
| | | |
|---|---|---|
| *H01M 10/653* | (2014.01) | |
| *H01M 10/658* | (2014.01) | |
| *H01M 10/659* | (2014.01) | |
| H01M 10/052 | (2010.01) | |

(52) U.S. Cl.
CPC ....... *H01M 10/658* (2015.04); *H01M 10/659* (2015.04); *H01M 10/052* (2013.01); *H01M 2220/20* (2013.01)

(56) References Cited

U.S. PATENT DOCUMENTS

| | | | |
|---|---|---|---|
| 3,984,222 A | 10/1976 | DeHaan | |
| 4,246,057 A | 1/1981 | Janowski | |
| 5,080,963 A | 1/1992 | Tatarchuk | |
| 5,304,330 A | 4/1994 | Tatarchuk | |
| 6,231,793 B1 | 5/2001 | Strasser | |
| 7,501,012 B2 | 3/2009 | Tatarchuk | |
| 8,420,023 B2 | 4/2013 | Tatarchuk | |
| 2004/0046147 A1* | 3/2004 | Matsuda | C09K 5/063 252/70 |
| 2004/0266951 A1* | 12/2004 | Akiyama | C08L 81/02 525/191 |
| 2005/0202310 A1 | 9/2005 | Yahnker | |
| 2009/0004556 A1* | 1/2009 | Al-Hallaj | H01M 10/4207 429/120 |

FOREIGN PATENT DOCUMENTS

| | | |
|---|---|---|
| CN | 102783741 | 11/2012 |
| CN | 103178314 | 6/2013 |

OTHER PUBLICATIONS

Agyenim, et al., "A review of materials, heat transfer and phase change problem formulation for latent heat thermal energy storage systems (LHTESS)", Renewable Sustainable Energy Rev., 14:615-28 (2010).

Jegadheeswaran and Pohekar, "Performance enhancement in latent thermal storage system a Review", Renewable Sustainable Energy Rev., 13:2225-44 (2009).

Khateeb, et al., "Design and simulation of a lithium-ion battery with a phase change material thermal management system for an electric scooter", J Power Source, 128:292-307 (2004).

Kizilel, et al., "Passive control of temperature excursion and uniformity in high-energy Li-ion battery packs at high current and ambient temperature", J Power Sources, 183:370-5 (2008).

Mills, et al., "Thermal conductivity enhancement of phase change materials using a graphite matrix", Appl. Therm Eng., 26:1652-61 (2006).

Rao and Zhang, "Thermal properties of paraffin wax-based composites containing graphite", Energy Sources, Part A, 33:587-93 (2011a).

Rao and Wang, "A review of power battery thermal energy management", Renew Sustain Energy Rev., 15:4554-71 (2011).

Salunkhe, et al.., "A review on effect of phase change material encapsulation on the thermal performance of a system" , Renew Sustain Energy Rev., 16:5603-16 (2012).

International Search Report and Written Opinion for corresponding PCT Application PCT/us2015/016175 mailed May 4, 2015.

Office Action for U.S. Appl. No. 14/413,995 mailed Nov. 2, 2016.

\* cited by examiner

THERMAL MANAGEMENT SYSTEMS FOR ENERGY STORAGE CELLS HAVING HIGH CHARGE/DISCHARGE CURRENTS AND METHODS OF MAKING AND USING THEREOF

CROSS-REFERENCE TO RELATED APPLICATIONS

This application claims priority to U.S. Provisional Application No. 61/940,105, filed Feb. 14, 2014; U.S. Provisional Application No. 61/947,695, filed Mar. 4, 2014; U.S. Provisional Application No. 61/969,401, filed Mar. 24, 2014; and U.S. Provisional Application No. 61/979,293, filed Apr. 14, 2014, the disclosures of which are incorporated herein by reference in their entirety.

FIELD OF THE INVENTION

This invention is in the field of thermal management systems for energy storage cells having high charge/discharge currents, such as batteries and other electronic devices.

BACKGROUND OF THE INVENTION

Rechargeable batteries, especially high-energy-density lithium-ion ("Li-ion") batteries, have been used in a variety of applications, such as power trains of electric vehicles (EVs) and hybrid electric vehicles (HEVs), consumer electronics, such as electric appliances, and aerospace and military applications due to their high energy density, high output power density, rapid charge capacity, rapid discharge capacity, and high open circuit voltage. These energy storage devices (ESDs) are required to operate at high charge and discharge rates to support loads for different applications. Even small form power batteries can provide very large currents. For example, A123's 26650 power batteries (ANR26650M1A) can provide a maximum 70 A continuous discharge rate and a maximum 10 A charge rate for a single cell.

However, most rechargeable Li-ion batteries are temperature sensitive. Li-ion batteries typically have an operating temperature range of −20-60° C., with an optimal operating temperature range of 25-40° C. and module-to-module temperature differences of less than 5° C. Storage or use of batteries at temperatures over 50° C. significantly lowers their discharge efficiency and longevity. For example, the capacity of Li-ion batteries has been shown to decrease 99+% after storage at 60° C. The power capacity of cells that experience 800 charge-discharge cycles-cells without significant drop in capacity under typical conditions dropped to less than 40% after 600 cycles at 50° C. and to less than 30% at 55° C.

Heat generation is more severe for cylindrical batteries compared to prismatic batteries because cylinders have a low surface-area-to-volume ratio. Research showed that during discharge, 54% of the generated heat is from ohmic resistance, 30% is from electrochemical reactions, and 16% is from activation polarization. It has been observed that heat generation can easily raise the battery skin temperature by 15° C. at a relatively low discharge rate of 1.7 C (5A). When such a temperature raise occurs, the battery may have to operate at a temperature close to its upper limit, resulting in significant performance degradation. For example, A123's ANR26650M1 A batteries, if discharged at the highest current of 70 A (28 C), generate a significant amount of heat (~30 W/cell). This amount of heat may not be problematic if the battery is directly exposed to an ambient temperature of 25° C. However, it can be a significant problem if multiple batteries are tightly packed in a battery pack and experience fast cycling between charge and discharge. In this case, the batteries have to be down-rated to 30 A (12 C) discharge for the battery pack instead of 70 A (28 C) for the single cell to avoid decreased capacity, shortened battery life, safety issues, or even catastrophic accidents In order to achieve high power capacity at reasonable voltages, hundreds of the types of batteries described above are typically packed closely in a finite space. Maintaining an appropriate temperature during operation is especially difficult with current battery chemistries and architectural designs when operating at rapid charge and discharge rates.

Battery thermal management methods can be classified according to their cooling method and media with common types being air-cooled, liquid-cooled, heat pipe, phase change material (PCM)-based thermal storage, thermoelectric, and cold plate, as shown in Table 1 and FIGS. 1a-c.

TABLE 1

Summary of thermal management strategies

| | Thermal Management Strategies | | | | | |
|---|---|---|---|---|---|---|
| | Forced Air | Liquid | Heat pipe | PCM | Thermoelectric | Cold plate |
| Ease of use | Easy | Difficult | Moderate | Easy | Moderate | Moderate |
| Integration | Easy | Difficult | Moderate | Easy | Moderate | Moderate |
| Efficiency | Low | High | High | High | Low | Medium |
| Temperature drop | Small | Large | Large | Large | Medium | Medium |
| Temperature distribution | Uneven | Even | Moderate | Even | Moderate | Moderate |
| Maintenance | Easy | Difficult | Moderate | Easy | Difficult | Moderate |
| Life | >20 years | 3-5 years | >20 years | >20 years | 1-3 years | >20 years |
| Initial cost | Low | High | High | Moderate | High | High |
| Annual cost | Low | High | Moderate | Low | High | Moderate |

Thermoelectric cooling and cold plate systems are least preferred due to a low coefficient of performance and poor contacting on the heat transfer interface, respectively. Forced air and liquid cooling approaches are active cooling approaches, which utilize external energy to achieve fast heat transfer. Typical air cooling systems have been widely employed in automobiles because of their simplicity and availability; however, they usually have decreased energy density due to the space required for air path channels. Air-cooling also requires loosely packed arrays with decreased energy density to allow sufficient air flow.

Liquid-cooled systems allow larger temperature drops and uniform temperature distributions relative to air-cooled systems, which can allow for very compact battery cooling design. These cooling systems have several common configurations including discrete tubing around each module, a cooling jacket around the modules, direct contact with (i.e. submersion in) a dielectric fluid, and placing the modules on a liquid cooled plate (e.g., heat sink). Both direct- and indirect-contact approaches, however, are required to be leak-free and short-circuit free. Direct contact approaches can achieve acceptable cooling performance; however, dielectric fluids are required to avoid short circuits. As a result, liquid-cooled systems are characterized by their short life and high cost.

Indirect contact approaches are typically more reliable than direct contact approaches, but their performance is hindered due to poor contacting between the batteries and cooling tubing/plates. Strategies that utilize cold plates and water jackets are also indirect-contact designs and exhibit the same limitations.

Phase change materials (PCM)-based cooling structures have been explored for cooling batteries and battery arrays. PCMs utilize the latent heat capacity of phase changes (i.e. solid-liquid or solid-solid phase changes) to capture and store heat. These structures store heat during fast battery charge and discharge and reduce the peak temperatures and release heat back to the environment slowly during off-peak operation (e.g. charge). Conventional PCM thermal management approaches do not necessarily need fast heat exchange with the environment as long as the heat exchange is sufficient enough to release enough heat to prevent overheating during off-peak operations. As a passive cooling approach, conventional PCM systems can be simple, reliable, low-weight, and compact. However, because of the slow rate at which they release heat to the surrounding environment, conventional PCM systems are considered thermal (enthalpy) storage systems rather than an effective external steady state cooling systems. For this reason, PCMs are not suitable for battery arrays with frequent, rapid charge and discharge cycles or for battery arrays used in environments where the ambient temperature is close to or above the melting point of PCMs.

PCMs also exhibit poor thermal conductivity when in the solid phase. Typical PCMs have thermal conductivities ranging from 0.2 to 0.5 W/m-K. The highest thermal conductivities of PCMs are 2.1 W/m-K for liquids and 0.53 W/m-K for solids. These low thermal conductivities may be sufficient for type 18650 cells because the intercell gaps are small; however, they are generally not sufficient for large cell arrays where the gaps are much larger. In this case, PCM close to the batteries may melt and the PCM far from the batteries may not be utilized. This can result in severe battery overheating and poor utilization of the PCM.

There exists a need for improved thermal management systems that effectively remove or disperse heat from high energy density batteries, such as rechargeable lithium-ion batteries.

SUMMARY OF THE INVENTION

Thermal management systems for packs or arrays of high energy density storage cells, such as batteries, and methods of making and using thereof are described herein. The system includes one or more thermal conductive microfibrous media comprising one or more phase change materials dispersed within the microfibrous media and one or more active cooling structures. In one embodiment, the system includes (1) thermally conductive microfibrous media (MFM) for improved interfacial heat transfer between the batteries and one or more active cooling structures (e.g. cooling water tubes or channels and/or cold plates); (2) one or more phase change materials (PCM) embedded or dispersed in the MFM (MFM-PCM) for cell peak temperature regulation (e.g., passive cooling); and (3) one or more thermally conductive films as electrically insulating materials to improve heat transfer. The system is a combination of active and passive cooling strategies. The MFM and thermally conductive films provide fast heat transfer for active cooling. The MFM and thermally conductive films also provide fast heat transfer to the PCM materials inside and improves the efficiency of the system. The latent heat capacity of the PCM also provides additional safety during cell operation.

The systems can be used for the efficient heat removal from ESD arrays to protect them from overheating. As a result, the useful life and operational safety of such devices can be extended for applications that require rapid charge and discharge rates, such as automobile, aerospace, and/or military applications. Similarly, the system can be used in consumer electronics, such as electrical appliances.

The MFM-PCM composite can also be used for Thermal or Infrared (IR) shielding. A composite of MFM and PCM with enhanced heat transfer to the environment can significantly reduce the temperature gradient between the shield and the environment. Moreover, the IR shield containing discrete MFM-PCM composite materials with PCM's of different melting temperatures will have a variety of different melting temperatures. The IR signal from this shield will therefore be blurred and the contour of the IR shield and the shielded subject will become ambiguous.

DETAILED DESCRIPTION OF THE INVENTION

I. Definitions

Figure 1A:
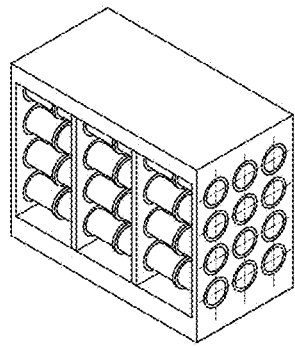
FIGS. 1A-1C are schematics of different thermal management designs for battery arrays including (a) liquid-cooled system for battery array (FIG. 1A); (b) liquid-cooled cold plate (FIG. 1B); and (c) PCM-based thermal storage (FIG. 1C).

"Microfibrous media", as used herein, means porous networks containing sintered micron-size fibers.

"Phase change materials" as used herein, refers to materials that utilize the latent heat capacity of phase changes (i.e. solid-liquid or solid-solid phase changes) to capture and store heat.

"Active cooling structures" as used herein, refers to structures or elements that use external energy/power to provide fast heat transfer from a hot body. Examples include, but are not limited to, cooling fan, radiator with circulated cooling water, etc.

"Passive cooling structures", as used herein, means cooling structures that do not use external energy/power to transfer heat from a hot body. Examples include, but are not limited to, heat sinks, cooling fins using natural convection, etc.

"Structure-forming agent", as used herein, refers to fibrous materials such as cellulose and polymer fibers (especially those long soft fibers with branches) that can entangle other fibers to form a 3-demensional mesh structures during wetlay sheet formation step. They should also be easily removed from the mesh structure.

"Viscosity modifier", as used herein, refers to a chemical or chemicals that can significantly increase the viscosity of the liquid suspension even at low concentrations.

"Foaming agent", as used herein, refers to surfactants that can generate foams or bubbles in the liquid suspension.

"C-rate", as used herein, refers to the rate at which a battery is discharged relative to its maximum capacity. It is defined as the discharge current divided by the theoretical current draw under which the battery would deliver its rated capacity in one hour. For example, a battery with a 10 C rate means that the discharge current will discharge the entire battery in 0.1 hour. For a battery with a capacity of 2.5 Amp-hrs, this equates to a discharge current of 25 Amps.

II. Thermal Management System

Thermal management systems which are effective at removing or dispersing heat from high energy density cells, such as rechargeable lithium-ion batteries, and methods of making and using thereof are described herein. The system includes three components: (1) microfibrous media (MFM) for improved interfacial heat transfer between the batteries and the active cooling structure (e.g. cooling water tubes or channels and/or cold plates); (2) one or more phase change materials (PCM) embedded or dispersed in the MFM (MFM-PCM) for the battery peak temperature regulation (e.g., passive cooling); and (3) one or more thermally conductive films as electrically insulating materials to improve the heat transfer. The system is a combination of active and passive cooling strategies. The MFM and thermally conductive films provide fast heat transfer for active cooling. The MFM also provides fast heat transfer to the PCM materials inside and improves the efficiency of the system. It is expected that this approach will provide improved heat transfer and regulation of the cell surface temperature. Moreover, the latent heat of the PCM also provides additional safety during cell operation.

A. Microfibrous Media (MFM)

Microfibrous media are highly-porous, sintered, nonwoven support structures capable of entrapping a variety of materials in a fixed-fluidized bed configuration. Microfibrous media can be made of polymer, ceramic, glass, metal, and/or alloy fibers (e.g., microfibers). The material selected for the microfibrous matrix depends on the desired application. Polymeric fibers are typically used for low cost applications, while ceramic/glass fibers are best for highly corrosive environments. Metal and alloy microfibers are preferred for cases where enhanced heat and/or electrical conductivity are desired. In some embodiments, the fibers are metallic fibers, such as copper, nickel, aluminum, steel, stainless steel, silver, or gold, or alloys thereof, or combinations thereof.

The fibers can be a mixture of fibers having different diameters, lengths, and/or composition. The fibers can have any suitable diameters, although the diameter is typically less than 1000 microns. In some embodiments, the diameter is from 0.5-200 μm, preferably 4-100 μm. The length of the fibers is typically from about 0.1 to 10 mm, preferably 1 to 10 mm, preferably 3 to 8 mm, preferably 4 to 8 mm, most preferably 5 to 6 mm. In some embodiments, the length of the fibers is about 1 mm.

In microfibrous media structures the volumetric loading of the metal fibers and materials entrapped therein are mostly independent of one another. This allows the relative amounts of each component to be adjusted over a wide range of parameters. In some embodiments, the concentration of the fibers in the system is from about 1 to about 40 vol. %, preferably from about 10 to about 30 vol. %.

The media can be prepared using techniques known in the art, such as wet-lay and sintering processes as disclosed in U.S. Pat. Nos. 5,080,963, 5,080,963, 5,304,330, 6,231,792, 7,501,012, and 8,420,023, which are incorporated herein by reference in their entirety.

The as-prepared media can contain 0.5-15 vol. % of fibers, typically 0.5-10 vol. %. The opening pore sizes of the media are in the range of 10-120 mesh, typically 50-100 mesh, and preferred 60-90 mesh, depending on the fiber diameter and fiber length and preparation conditions. The void space is at least about 60%, preferably from about 85 to about 99.5%. Fiber length can vary but is typically about 0.1 to about 10 mm. The as-prepared media can be processed to reach the aforementioned preferred fiber volumetric fractions.

The media can contain multiple layers containing fibers of different diameters and/or different materials depending on materials to be entrapped and/or intended application. The fibers in the multiple layers can be fused together during the sintering step.

In some embodiments, the MFM further contains carbon fibers, graphite fibers, and/or carbon nanotubes, such as single-walled and/or multiwalled nanotubes. The carbon/graphite fibers can be in the form of wet-lay sheets, bonded threads or yarns, and/or woven sheets. The diameter of the fibers can vary. However, in some embodiments, the diameter of the fibers is from about 1 nm to about 250 microns, preferably 1 micron or greater, such as from about 1 micron to about 250 microns or from about 1 micron to about 100 microns.

MFM is a good interfacial material for improving heat transfer in batteries, particularly cylindrical batteries. MFM are flexible and deformable so that MFM can be deformed to match various surfaces, i.e. the surfaces of batteries and the cooling structures. MFM made of micro-size metal fibers can form multiple contacting points on the surfaces.

B. Phase Change Materials

Embedded or dispersed within the microfiborus media is one or more phase change materials. "Phase change materials" or "PCM" are materials that utilize the latent heat capacity due to phase changes (e.g., solid-liquid or solid-solid phase changes) to capture and store heat. In some embodiments, the concentration of the PCM in the PCM-MFM composite is from about 65 to about 95 vol. %, preferably from about 70 to about 80 vol. %.

In some embodiments, the one or more phase change materials are chemically inert to the metal fibers. In some embodiments, the one or more phase change materials are electrically insulating. In some embodiments, the one or more phase change materials have heats of fusion larger than 75, 80, 85, 90, 95, 100, 105, 110, 115, 120, 125, 130, 135, 140, 150, 160, 170, 180, 190, 200, 210, 220, 230, 240 or 250 J/g. In some embodiments, the one or more phase change materials have heats of fusion ranging from 100 J/g to 250 J/g.

In some embodiments, the one or more phase change materials have a melting temperature range of less than 5° C., more preferably less than 2° C. In some embodiment, the one or more phase change materials have a solidifying temperature range of less than 5° C., more preferably less than 2° C. In some embodiments, the one or more phase change materials have a melting temperature range and a solidifying temperature range that overlap with a maximum difference of 2° C., more preferably 0° C. In some embodiments, the PCM solidify at a temperature higher than the temperature of the cooling water circulating through active cooling structures. In some embodiments, the PCM solidify at a temperature below the threshold temperatures of the energy storage cell.

The PCM can be any material known in the art. In some embodiments, the one or more phase change materials are selected from paraffin waxes, polyethylene glycols, fatty acids, metals salts with crystal water, low melting eutectics including metal alloys and mixed chemicals, and combinations thereof. Preferred PCM materials are paraffin waxes, hydrated metal salts, eutecitcs and the materials described in Table 2.

Exemplary phase change materials and their physical properties are shown in Table 2.

TABLE 2

Exemplary/Preferred PCMs and their properties

| Compound | Melting point (° C.) | Latent heat of fusion (kJ/kg) | Thermal conductivity (W/mK) |
|---|---|---|---|
| RT25-RT30 | 26.6 | 232.0 | 0.18 (liquid), 0.19 (solid) |
| n-Octadecane | 27.7 | 243.5 | 0.148 (liquid), 0.19 (solid) |
| $CaCl_2 \cdot 6H_2O$ | 29.9 | 187 | 0.53 (liquid), 1.09 (solid) |
| $Na_2SO_4 \cdot 10H_2O$ | 32, 39 | 180 | 0.15 (liquid), 0.3(solid) |
| Paraffin wax | 32-32.1 | 251 | 0.514 (solid), 0.224 (liquid) |
| Capric acid | 32 | 152.7 | 0.153 (liquid) |
| Lauric-palmitic | 35.2 | 166.3 | — |
| Lauric acid | 41-43 | 211.6 | 1.6 |
| Stearic acid | 41-43 | 211.6 | 1.60 (solid) |
| Medicinal paraffin | 40-44 | 146 | 2.1 (liquid), 0.5 (solid) |
| Paraffin wax | 40-53 | — | — |
| P116-Wax | 46.7-50 | 209 | 0.277 (liquid), 0.140 (solid) |
| Indrawax 5860-FE | 57-59 | — | — |
| Indrawax 6062-FE | 60-62 | — | — |

In particularly preferred embodiments, the PCM have a melting temperature range and a solidifying temperature range that overlap with a maximum difference of 2° C., preferably with no difference in these ranges. Preferably the PCM is a material that does not cause cross contamination when used in a thermal management systems, particularly when placed in contact with packs or arrays of batteries. Additionally, the PCM preferably uniformly conforms to the structure of the MFM. Exemplary preferred PCMs are waxes.

The MFM-PCM composites typically have thermal conductivities in the range of 10-25 W/m-K, depending on the MFM composition. Compared to systems which only contain the PCM, a system containing a composite of the same PCM along with a MFM has a thermal conductivity that is at least 10 times greater than the thermal conductivity of the PCM alone, typically the increase in thermal conductivity ranges from about 20-125 times when comparing a composite of a PCM and an MFM to the same PCM alone.

C. Active Cooling Structures

The systems described herein typically also contain one or more active cooling structures that dissipate heat generated from the cell. In some embodiments, the cooling structures are tubes or channels through which cooling water flows to dissipate heat generated from the cell. In other embodiments, the structures are cooling plates that dissipate heat generated from the cell. In some embodiments, the systems contain a combination of tubes or channels and plates.

The tubes, channels, and/or plates can be made from any material that effectively transfers or dissipates heat. In some embodiments, the tubes, channels, and/or plates can be made from metal, ceramics, and/or glass. Suitable metals include, but are not limited to, copper, nickel, aluminum, steel, stainless steel, silver, gold, alloys thereof, and combinations thereof. Suitable ceramics include, but are not limited to, alumina, aluminum nitride, boron nitride, silicon carbide, enamel, quartz, and combinations thereof.

D. Electrically Insulating, Thermally Conductive Films

The system can further contain one or more thermally conductive films to improve heat transfer. The films, in combination with the microfibrous media, participate in passive cooling by providing rapid heat transfer to the PCM.

These films can serve as replacement for plastic wraps typically found on commercially available batteries. The film must be electrically insulating and thermally conductive.

The films can be formed from any material or materials known in the art which are thermally conductive. Examples include polymeric materials, ceramics, glasses, enamels, and combinations thereof. Suitable polymers include, but are not limited to, thermally conductive polypropylene, polyamide, copolyester elastomers, polyphenylene sulfide, liquid crystalline polymers, thermoplastic elastomers, and combinations thereof. Suitable ceramics include, but are not limited to, alumina, boron nitride, aluminum nitride, and combinations thereof.

The thickness of the film can vary. The film is preferably sufficiently thick such that the film tolerates abrasions and has sufficiently strong dielectric for the applied voltage. In some embodiments, the thickness of the film ranges from about 50 microns to about 1000 microns.

III. Methods of Making

MFM can be prepared as described above. The phase change material(s) can be incorporated into the MFM by melting the PCM and soaking the MFM in the liquid PCM, analogous to soaking a sponge in water. After the PCM cools and solidifies, the PCM in MFM (MFM-PCM composite) is formed. MFM-PCM can be prepared in different shapes, patterns and structures for insertion in energy storage devices (e.g. batteries and supercapacitors).

In order to improve heat transfer, the plastic wrap or paper typically used as electrically insulating materials in batteries can be replaced with thermally conductive and electrically insulating films.

The thermally conductive and electrically insulating films can be prepared using a variety of techniques depending on the materials. If a ceramic is used, the ceramic can be coated onto the battery/cell metal tubes by plasma coating, dip coating, chemical vapor deposition, and thermal spray. If a polymer is used, the polymer can be formed into a thin plastic tube and the battery/cell can be slid into the polymeric tube.

IV. Methods of Using

Figures 3A, 3B:
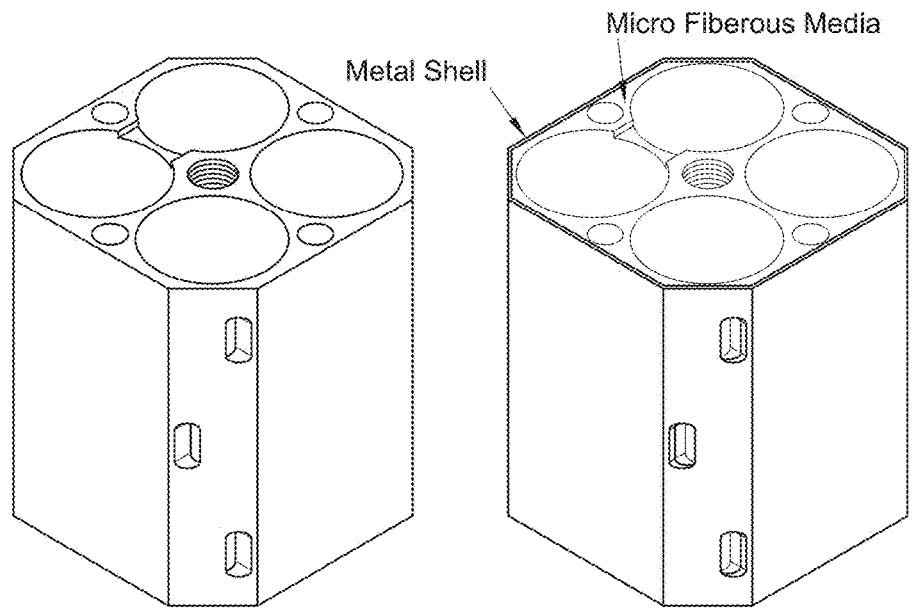
FIG. 3A is an aluminum block for battery cooling.
FIG. 3B is a MFM/MFM-PCM with a sheet metal shell for battery cooling.

The thermal management systems described herein can be used to remove, disperse, or dissipate heat from high energy density cells including, but not limited to, batteries, capacitors, super capacitors, and combinations thereof. In one embodiment, the cell is a battery, such as a rechargeable lithium-ion battery. In some embodiment, the system is used with multiple cells (e.g., batteries), such as a battery pack or battery array. In these embodiments, the system is designed to include tubes, slots or other structures into which a cell (e.g., battery can be inserted). The cell can be encapsulated in one or more thermally conductive, electrically insulating films. An example of the thermal management system is shown in FIG. 3B. The larger diameter cylinders are where the cells (e.g., batteries) are inserted while the smaller diameter cylinders are the active cooling structure. In some embodiments, cooling water is circulated through these smaller diameter cylinders.

In order to achieve high power capacity at reasonable voltages, hundreds of batteries may be packed closely in a finite space. Maintaining an appropriate temperature during operation is especially difficult with current battery chemistries and architectural designs when operating at rapid charge and discharge rates. The batteries can be any shape, such as cylindrical (e.g., small, large, etc.), pouch, and/or prismatic. In some embodiments, the batteries are cylindrical in shape. Different battery types and methods of making thereof are known in the literature.

Lithium-ion batteries (sometimes Li-ion batteries or LIB) are members of a family of rechargeable battery types in which lithium ions move from the negative electrode to the positive electrode during discharge and back when charging. Li-ion batteries use an intercalated lithium compound as the electrode material, compared to the metallic lithium used in non-rechargeable lithium battery.

Lithium-ion batteries are common in consumer electronics. They are one of the most popular types of rechargeable battery for portable electronics, with one of the best energy densities, little or no memory effect and only a slow loss of charge when not in use. Beyond consumer electronics, LIBs are also growing in popularity for military, electric vehicle and aerospace applications. For example, lithium-ion batteries are becoming a common replacement for the lead acid batteries that have been used historically for golf carts and utility vehicles. Instead of heavy lead plates and an acid electrolyte, the trend is to use a lightweight lithium/carbon negative electrodes and lithium iron phosphate positive electrodes. Lithium-ion batteries can provide the same voltage as lead-acid batteries, so no modification to the vehicle's drive system is required.

Chemistry, performance, cost and safety characteristics vary across LIB types. Handheld electronics mostly use LIBs based on lithium cobalt oxide ($LiCoO_2$), which offers high energy density, but presents safety risks, especially when damaged. Lithium iron phosphate (LFP), lithium manganese oxide (LMO) and lithium nickel manganese cobalt oxide (NMC) offer lower energy density, but longer lives and inherent safety. Such batteries are widely used for electric tools, medical equipment and other roles. NMC in particular is a leading contender for automotive applications. Lithium nickel cobalt aluminum oxide (NCA) and lithium titanate (LTO) are specialty designs aimed at particular niche markets.

Lithium-ion batteries can be dangerous under some conditions and can pose a safety hazard since they contain, unlike other rechargeable batteries, a flammable electrolyte and are also kept pressurized. Because of this the testing standards for these batteries are more stringent than those for acid-electrolyte batteries, requiring both a broader range of test conditions and additional battery-specific tests. This is in response to reported accidents and failures, and there have been battery-related recalls by some companies. For example, if overheated or overcharged, Li-ion batteries may suffer thermal runaway and cell rupture. In extreme cases this can lead to combustion. The thermal management systems described herein more effectively dissipate heat and therefore may reduce incidents due to overheating or overcharging.

The thermal management system described herein can be used to remove heat from power cells, such as batteries, and allows for the rapid charge and discharge of the cells. The rate of charge and discharge of the cells can be measured by the C-rate. The rate of discharge for small power cells (i.e., 26650 cells or less) is in the range of 4-28 C while the rate for midform cells (diameter greater than 2 inches) is in the range of 2-15 C. For comparison, lead acid cells are discharged at a range of about 0.05-0.2 C. Preferably, the thermal management systems are used with an array of power cells, where the power cells have discharge rates of 1 C or greater, preferably at least 4 C, optionally even higher, such as up to 28 C, or even greater.

Besides the applications for cells and battery packs, the MFM-PCM composite are useful as a Thermal and Infrared (IR) shielding blanket or barrier. A composite of MFM and PCM with enhanced heat transfer to the environment can significantly reduce the temperature gradient between the shield and the environment. An application of a thermal shield can be used in "cool" jackets which firefighters wear to protect them from excessive heat. The composite of MFM and PCM in the cool jacket allows firefighters to withstand a high temperature environment for an extended period of time.

Moreover, the IR shield containing discrete MFM-PCM composite materials with PCM's of different melting temperatures will have different temperatures. The IR signal from this shield will therefore be blurred and the contour of the IR shield and the shielded subject will become ambiguous. The infrared shielding blanket can be used to avoid detection from Infrared flair thermal imaging cameras and other detection methods.

Figure 11:
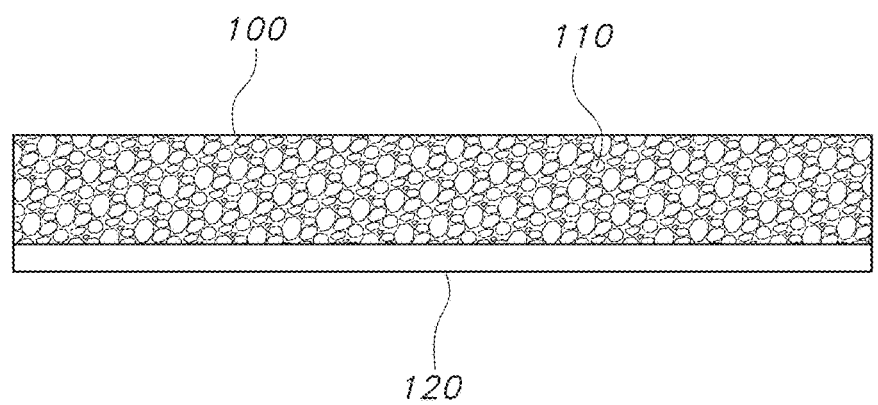
FIG. 11 is schematic cross-sectional view of an exemplary thermal or infrared shielding barrier or blanket.

Illustrated in FIG. 11 is a schematic for a thermal or infrared shielding barrier or blanket. The blanket or barrier 100 includes a MFM-PCM composite 110. Typically one side of a flexible material 120, such as any woven or nonwoven material or fabric, is covered with the MFM-PCM composite.

EXAMPLES

Example 1

Battery Array Containing Thermal Management System

Figure 1C:
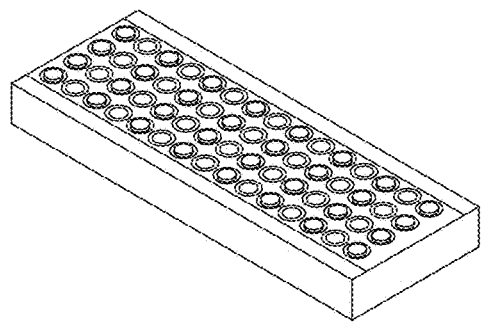
Figure 1B:
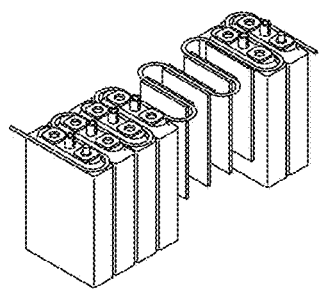
Figure 2:
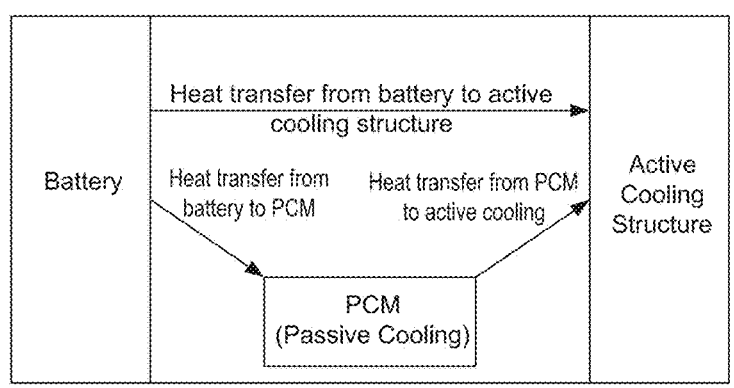
FIG. 2 is a schematic of a cooling structure for battery thermal management.

Multiple battery packs were assembled to hold 16 batteries electrically connected in 4p4s (4 paralleled series with 4 batteries in a series) pattern. Cooling water channels were introduced inside the cooling structures as shown in FIG. 1. The arrays were distinguished based on the material used to form the cooling structures: Al-block (Aluminum cooling block) and MFM-PCM (copper microfibrous media with phase change materials). Al-block is neat active cooling design; MFM-PCM is a combination of active and passive cooling approaches (see FIGS. 3a and 3b).

Table 3 compares the Al-block and MFM-PCM with other typical battery cooling structures for 16 batteries (26650 power batteries) in a 4p4s array. Table 3 shows that MFM-PCM with 70 vol. % of PCM has a comparable heat capacity compared to PCM-only devices, which is about twice the heat capacity of non-PCM devices. As a result, the 26650 batteries can be discharged at high current for 9.1 min, also twice the time for as the Aluminum block array. MFM also has the highest overall heat transfer co-efficient due to the use of copper MFM.

Figure 4:
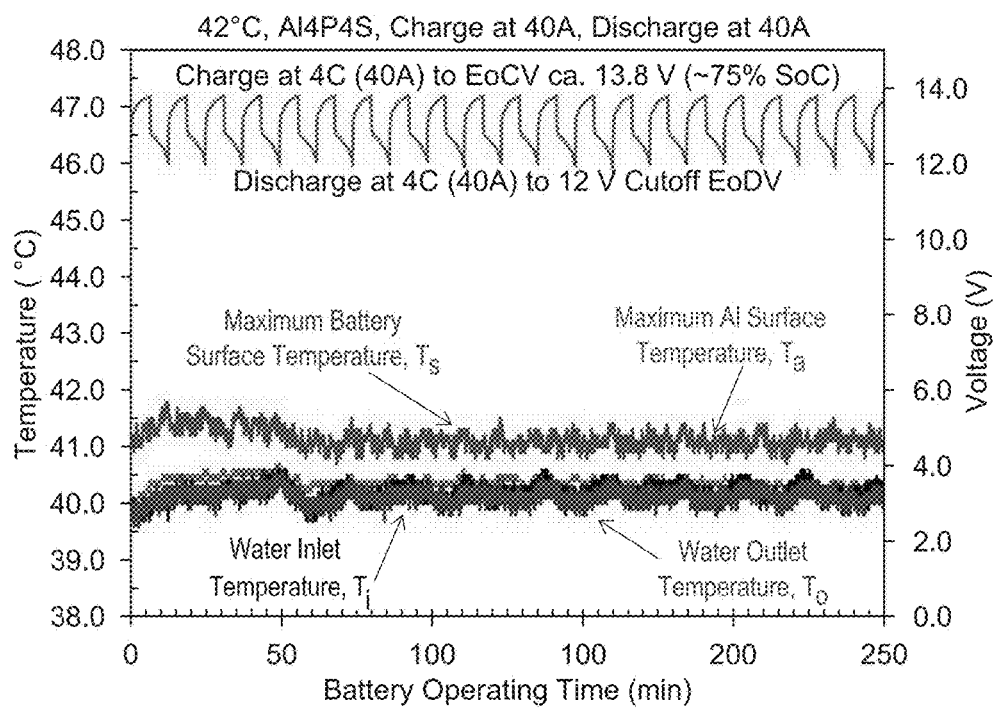
FIG. 4 is a graph showing the performance of Al-4p4s (temperature (° C.) and voltage (V) as a function of battery operating time) discharged and charged at a constant current of 40 A.
Figure 5:
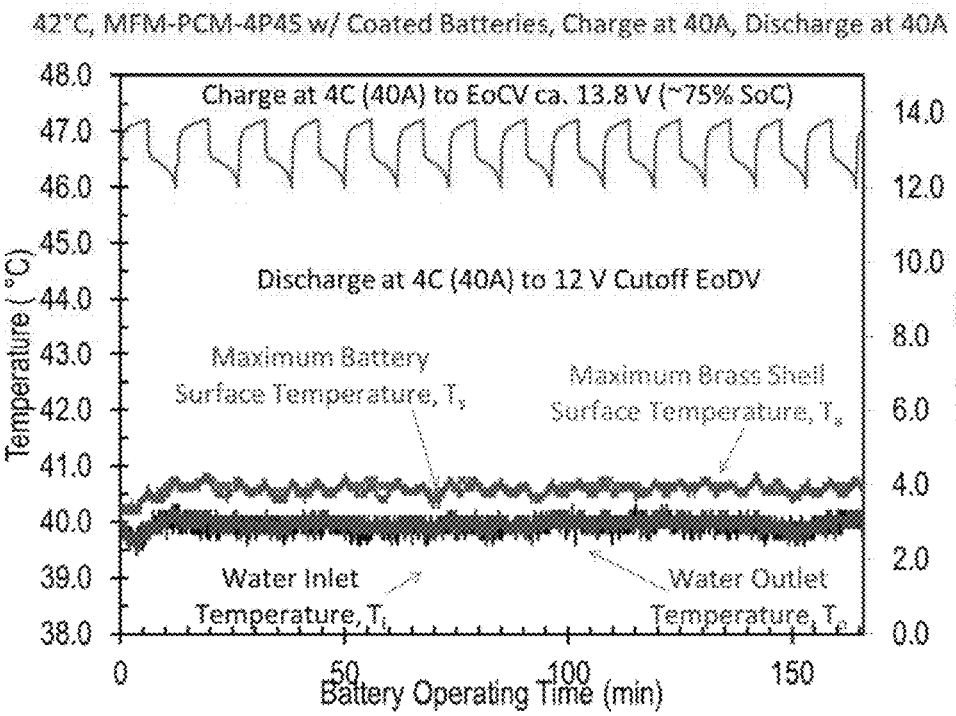
FIG. 5 is a graph showing the performance of MFM-PCM-4p4s (temperature (° C.) and voltage (V) as a function of battery operating time) discharged and charged at a constant current of 40 A.

If the battery packs are charged and discharged at a constant current, i.e. the maximum allowed charge current, the battery pack behavior will be close to a resistor. FIGS. 4 and 5 show the temperature profiles of Al-block and MFM-PCM batteries packs charge and discharged at 40 A. The temperature profiles are almost straight lines as long as the inlet water temperature remained constant, which suggests the resistor assumption is valid. Moreover, all the temperatures are below 42° C., which means the PCM was in its solid form and its contribution to heat transfer is negligible.

FIG. 5 also shows that the temperature gradient between battery surface and the shell (media) in MFM-PCM was negligible compared with that in Al-block. This result suggests that the heat transfer across the interface between the MFM-PCM and battery surface is much faster than across the interface between the Al-block and battery surface. A detailed estimation showed that Al-block had a heat transfer rate of 170 $W/m^2$-K across the heat transfer interface and the MFM-PCM provided a heat transfer rate of 1300-2100 $W/m^2$-K, which is 8-12 times faster than the Al-block. These results show that the MFM can drastically mitigate heat transfer resistance across various interfaces. Fast heat transfer of the MFM is important for batteries under extremely high charge and discharge currents.

Figure 6:
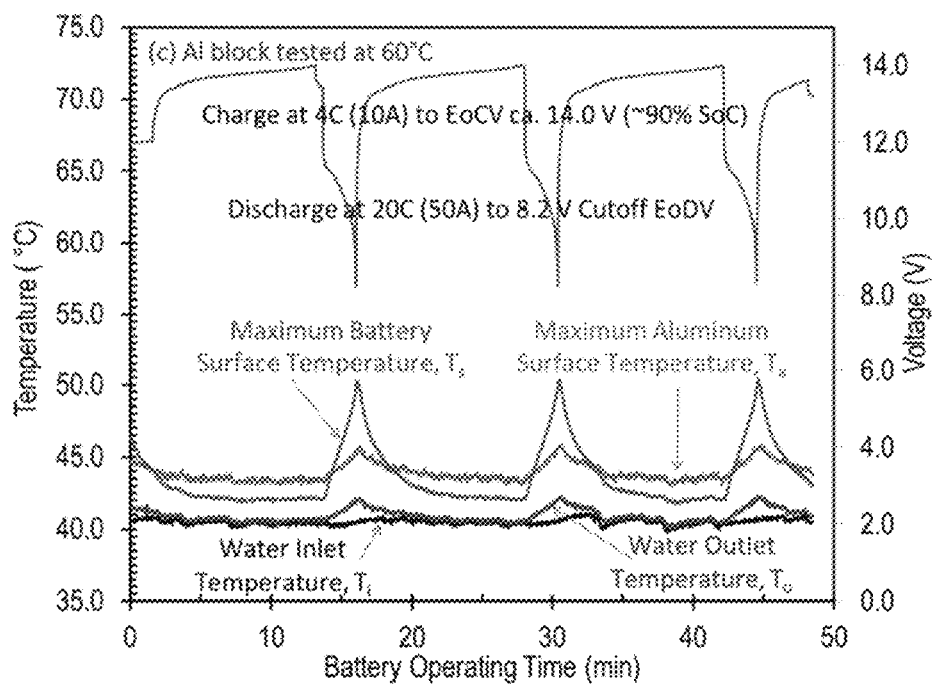
FIG. 6 is a graph showing the performance of an Al-4s battery pack (temperature (° C.) and voltage (V) as a function of battery operating time) at a discharge rate of 50 A.
Figure 7:
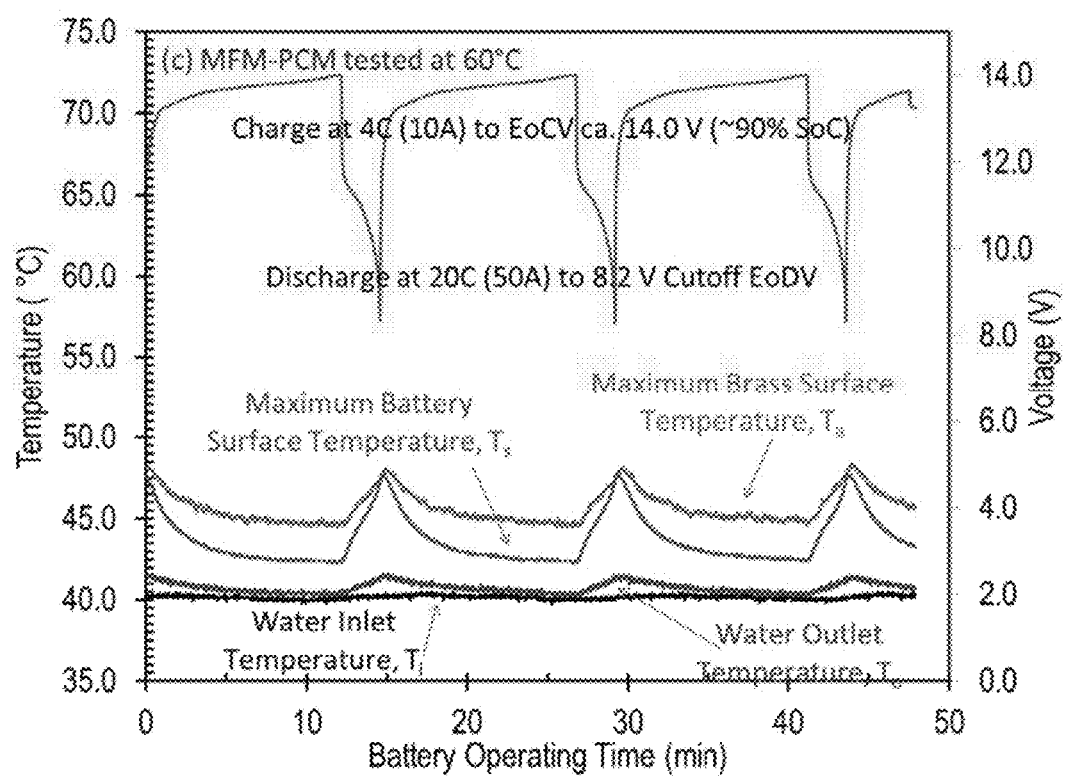
FIG. 7 is a graph showing the performance of an MFM-PCM-4s battery pack (temperature (° C.) and voltage (V) as a function of battery operating time) at a discharge rate of 50 A.
Figure 8:
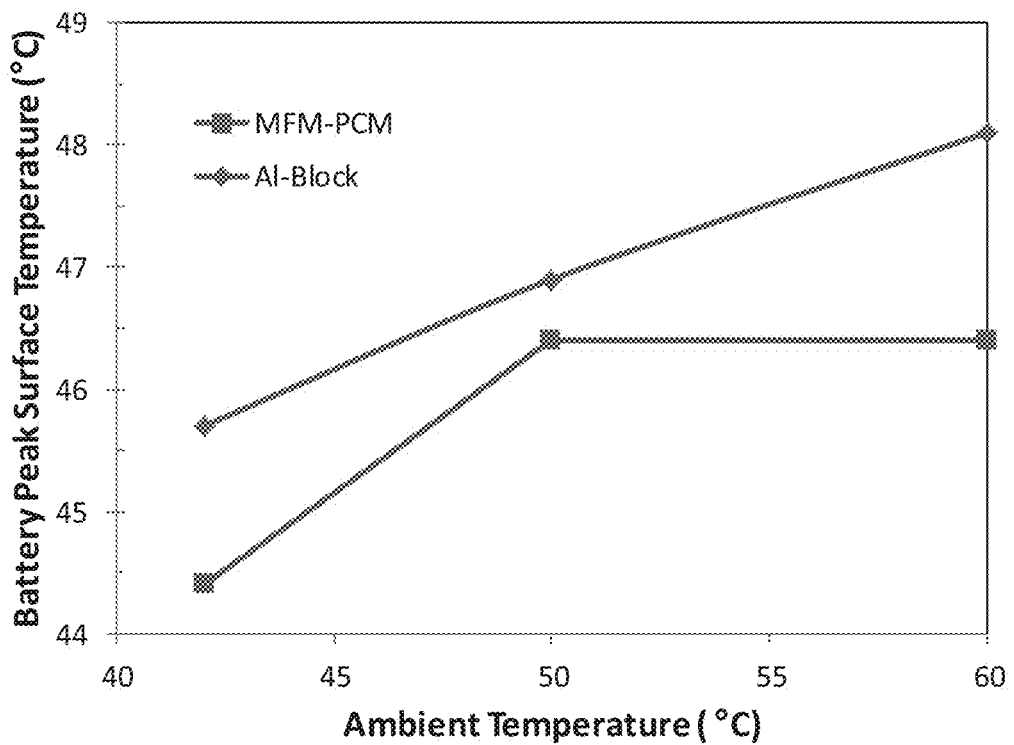
FIG. 8 is a graph showing the battery peak surface temperature of an MFM-PCM-4s battery pack at a discharge rate of 30 A as a function of temperature.

When PCM is inserted into the MFM matrix, it can regulate the battery temperature due to its significant latent heat of fusion. In the comparative experiments, Al-block and MFM-PCM were compared at a discharge rate of 50 A and an ambient temperature of 60° C. In the MFM-PCM, the PCM has a nominal melting temperature of 42-46° C. As shown in FIGS. 6 and 7, the Al-block battery pack reached a peak temperature of 50° C., and the MFM-PCM battery pack reached a temperature of 47° C., which is very close to the PCM melting temperature. Another series of tests were performed at a discharge rate of 30 A and various temperatures, 42, 50 and 60°. The results are shown in FIG. 8.

The Al-block showed almost a linear trend in the battery surface temperature vs ambient temperature plot. The same plot of MFM-PCM became stable after the battery surface temperature reached 46.4° C. The PCM inside the MFM regulated the battery surface temperature in the vicinity of its melting point range.

TABLE 3

Comparison of different battery packs updated for heat generation at 6.3 W/cell.

| Cooling Media | Weight (g) | ΔH (40-60° C.) | | | ΔH/V (KJ/L) | ΔH/Q (min) | $h_{overall}$ ($W/m^2$-K) [2] | ΔT (° C.) [3] |
| | | Latent (KJ) | CpΔT (KJ) | Total (KJ) | | | | |
|---|---|---|---|---|---|---|---|---|
| Case 1: Water [4] | 1472 | | 36 | 36 | 49 | 6.0 | 200 | 6.1 |
| Case1: Al Block [4] | 1784 | | 30 | 30 | 40 | 4.9 | 220 | 5.6 |
| Case 2: PCM only [5] | 1472 | 44 | 29 | 64 | 86 | 10.6 | 48 | 25.5 |
| Case 3: MFM (30 vol. % Cu) | 1780 | | 24 | 24 | 33 | 4.0 | 390 | 3.1 |
| Case 4: MFM-PCM (30 vol % Cu + 70 vol. % PCM) | 1896 | 30 | 30 | 61 | 74 | 9.1 | 420 | 2.9 |

[1] The battery pack has a volume of 736 ml with 16 A123's 26650 cells (2.6 cm dia. × 6.5 cm, 7 mΩ). The batteries are discharged at 12 C (30 A) per cell and generate heat (Q) at 25.2 W.
[2] Overall heat transfer coefficients are based on the external battery surface area.
[3] ΔT is the temperature gradient between cooling water and the battery plastic skin.
[4] When water is the cooling media inside the battery pack, it is assumed that there is a very thin (thermal resistance = 0) insulting film separating the water and batteries. When aluminum is the cooling media, it is assumed that the batteries are inserted inside an aluminum block.
[5] It is assumed that PCM (i.e. paraffin wax) has a density of 0.9 g/ml, a latent heat of 210 kJ/kg and average thermal conductivity of 1.3 W/m-K. PCM will melt in this case.

Moreover, the latent heat of PCM also provides extra safety protection to the cells in the battery pack. As shown in Table 1, the latent heat of the PCM is the same as the sensible heat of the battery pack. Therefore, PCM-MFM allows the battery pack to operate for twice as long as a battery pack without PCM. However, PCM cannot provide such benefits without MFM. As mentioned in the literature, PCMs have very low thermal conductivities. Only the PCM around the batteries will melt during discharge while the PCM removed from the batteries will remain solid and utilized. Therefore, the PCM needs thermally conductive structures implanted inside PCM to enhance the heat transfer rate and PCM utilization.

Figure 9:
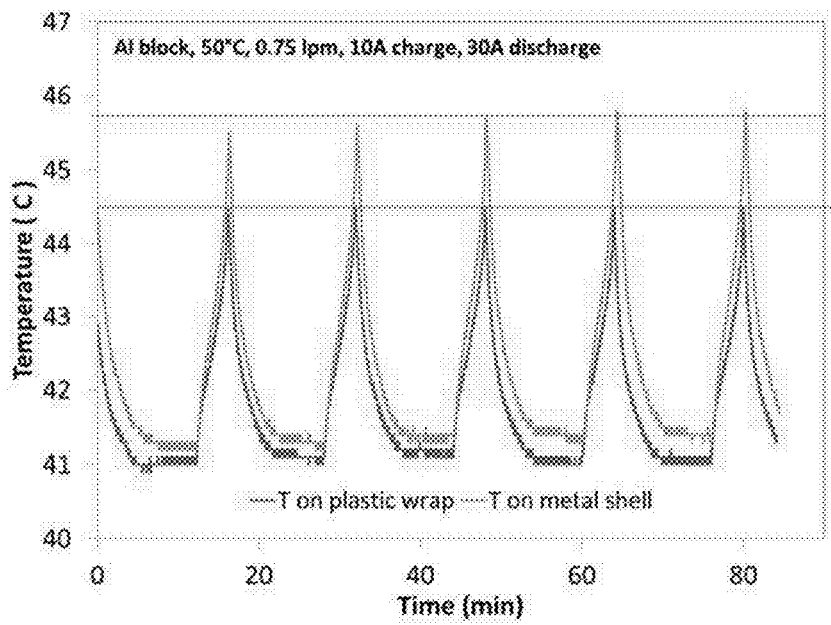
FIG. 9 is a graph showing the temperature gradient over the original plastic wrap (75 micron) on A123 batteries discharged at 30 A.
Figure 10:
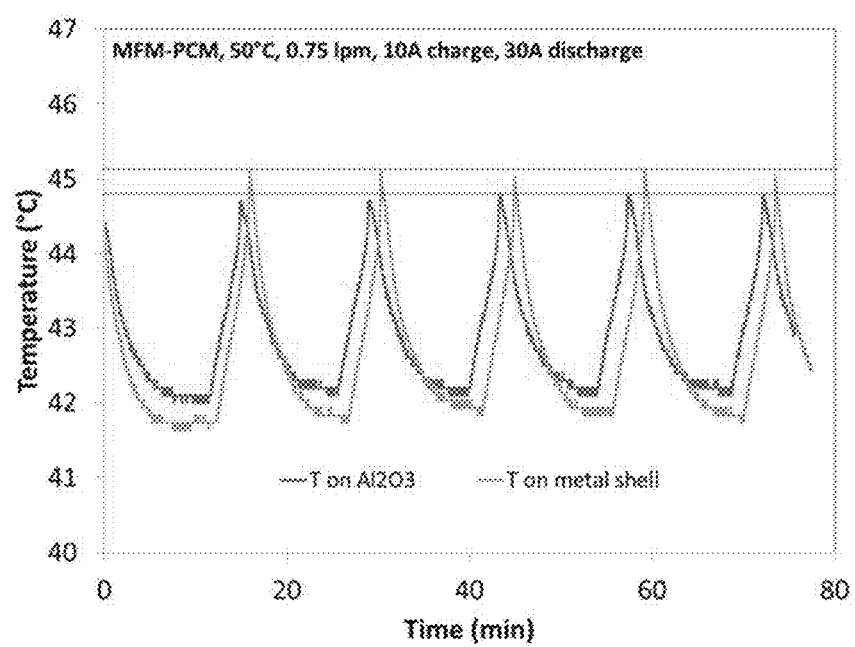
FIG. 10 is a graph showing the temperature gradient over the coated $Al_2O_3$ (225 micron) film on A123 batteries discharged at 30 A.

Another element of heat transfer resistance that is commonly ignored is the electrically insulating materials on the batteries. These materials are typically made from polymers and/or paper, both of which are thermally and electrically insulating. In the tests for the power 26650 batteries, the measured temperature gradient across the insulating materials was 1.2° C. across the 75 micron thick plastic wrap at a discharge current of 30 A (FIG. 9). It was estimated that for larger batteries with much higher discharge rates (e.g. 500 A) the temperature gradient can be as high as 40° C. for a 150 micron thick insulating layer, which makes the battery pack unsafe to operate. When the plastic insulating materials were replaced with thermally conductive ceramic, the temperature gradient across the insulating materials was measured to be 0.3° C. across the ceramic coating having a thickness of 225 micron (FIG. 10), which is only ¼ of that across the plastic insulating layer. Even without any further improvement in thermal conductivity of the ceramic insulating layer, the maximum temperature gradient across the insulating layer of a large battery will be 5° C. across the across the ceramic coating having a thickness of 225 microns. This low temperature gradient gives enough room to operate larger batteries safely.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. An energy storage pack or array comprising a plurality of energy storage cells and a thermal management system
   wherein the thermal management system comprises one or more thermal conductive microfibrous media and one or more active cooling structures,
   wherein the microfibrous media are porous networks comprising sintered micron-size fibers, wherein one or more phase change materials are dispersed within the microfibrous media, and
   wherein the microfibrous media is machined and/or deformed to match one or more surfaces of the cells and the one or more active cooling structures.

2. The pack or array of claim 1, wherein the cells comprise batteries.

3. The pack or array of claim 2, wherein the batteries comprise lithium-ion batteries.

4. The pack or array of claim 1, wherein the cells are characterized with a C-rate of greater than 1 C.

5. The pack or array claim 1, wherein the one or more cells comprise one or more electrically insulating, thermally conductive films that encapsulate the cells.

6. The system of claim 1, wherein the one or more active cooling structures comprises tubes or channels that pass through the microfibrous media.

7. The system of claim 6, wherein the tubes or channels are formed from a material selected from the group consisting of metal, ceramics, and glass, and combinations thereof.

8. The pack or array of claim 5, wherein the electrically insulating films comprise one or more thermally conductive polymers.

9. The pack or array of claim 5, wherein the electrically insulating films comprise one or more thermally conductive ceramics.

10. The pack or array of claim 9, wherein the thermally conductive ceramic is selected from the group consisting of alumina, boron nitride, aluminum nitride, and combinations thereof.

11. The pack or array of claim 5, wherein the electrically insulating films comprise glass or enamel.

12. The pack or array of claim 5, wherein the thickness of the film is from about 50 microns to about 1000 microns.

13. The pack or array of claim 1, wherein the energy storage cells are cylindrical.

14. The pack or array of claim 13, wherein the microfibrous media comprises openings in the shape of cylinders into which the cells are inserted.

15. The pack or array of claim 1, wherein the sintered fibers are sintered metal fibers selected from the group consisting of copper, nickel, aluminum, steel, stainless steel, silver, gold, and alloys, and combinations thereof.

16. The pack or array of claim 1, wherein the microfibrous media further comprise carbon fibers, graphite fibers, single wall or multi-wall carbon nanotubes, or a combination thereof.

17. The pack or array of claim 16, wherein the microfibrous media further comprise carbon fibers, and wherein the diameter of the carbon fibers is from about 1 nanometer to about 250 microns.

18. The pack or array of claim 1, wherein the volumetric loading of fibers in the microfibrous media ranges from about 1 to about 40 vol. %.

19. The pack or array of claim 1, wherein the one or more phase change materials are selected from the group consisting of paraffin waxes, polyethylene glycols, fatty acids, metal salts, and combinations thereof.

20. The pack or array of claim 19, wherein the phase change material is immobilized inside the microfibrous media or encapsulated within a higher melting point material that is immobilized inside the microfibrous media.

21. The pack or array of claim 15, wherein the one or more phase change materials and/or phase change material encapsulating materials are chemically inert to the metal fibers.

22. The pack or array of claim 1, wherein the one or more phase change materials and/or phase change material encapsulating materials are electrically insulating.

23. The pack or array of claim 1, wherein the one or more phase change materials have heats of fusion larger than 100 J/g.

24. The pack or array of claim 1, wherein the one or more phase change materials have a melting temperature range of less than 5° C.

25. The pack or array of claim 1, wherein the one or more phase change materials have a solidifying temperature range of less than 5° C.

26. The pack or array of claim 1, wherein the one or more phase change materials have a melting temperature range and a solidifying temperature range which overlap with a maximum difference of 2° C.

27. The pack or array of claim 1, wherein cooling water passes through the active cooling structures.

28. The pack or array of claim 1 in the form of a rechargeable battery, capacitor, supercapacitor, or other electronic device.

\* \* \* \* \*